July 11, 1967 J. J. ROUBAL 3,330,064

APPARATUS FOR DUSTING

Original Filed Jan. 9, 1961

INVENTOR

Joseph J. Roubal

United States Patent Office 3,330,064

Patented July 11, 1967

3,330,064

APPARATUS FOR DUSTING

Joseph J. Roubal, 5135 W. 22nd Place, Cicero, Ill. 60650

Continuation of applications Ser. No. 89,085, Jan. 9, 1961, Ser. No. 248,186, Dec. 27, 1962, and Ser. No. 405,007, Oct. 7, 1964. This application June 30, 1966, Ser. No. 563,633

2 Claims. (Cl. 43—147)

This invention relates to new and improved apparatus for dusting especially of ground growing plants, and this application is a continuation of my co-pending, now abandoned, application, Ser. No. 405,007, filed Oct. 7, 1964 as a continuation of now abandoned application Ser. No. 248,186, filed Dec. 27, 1962 as a continuation of now abandoned application Ser. No. 89,085, filed Jan. 9, 1961.

It is desirable that a growing plant be dusted with insecticide and or fungicide powder dust especially for the under sides of the leaves in order that the plant is assured of more complete protection against insect damage and or fungus infection.

It is the object of the invention to provide apparatus that generally distant from its required holding and handling obtains a locating and the expansion by a gust of air in direct presence of the atmosphere of a restricted quantity of insecticide and or fungicide powder dust.

Another object is to provide apparatus useful for dusting of the under sides of leaves of ground growing plants.

The advantage realized in accordance with the invention by the expansion by a gust of air of a restricted quantity of the powder dust in direct presence of the atmosphere resides in that a complete particle expansion of the powder dust is thereby obtained.

Also gusts of air of different intensities are permitted to be used which is to the end of obtaining controlled variable, complete expansion of the powder dust.

And it will be seen that such in the dusting of plants is applied to irregular smaller or larger bows and branches carrying the plant leaves and foliage, and, also, where single larger, or small, whole plants will thereby require ony a single application dusting.

Also, there is realized the advantage that, in dusting, the powder dust is subject to more exact, and therewith economical utilization.

The above and other objects in view are realized in practicing and use of the invention consisting of the novel construction, combination and arrangement of parts hereinafter more specifically described and illustrated in the accompanying drawings, wherein is shown an embodiment of the invention, but it is understood that changes, variations and modifications can be made which fall within the scope of the claims hereunto appended.

Figures 1, 2, 3, 4, 5:
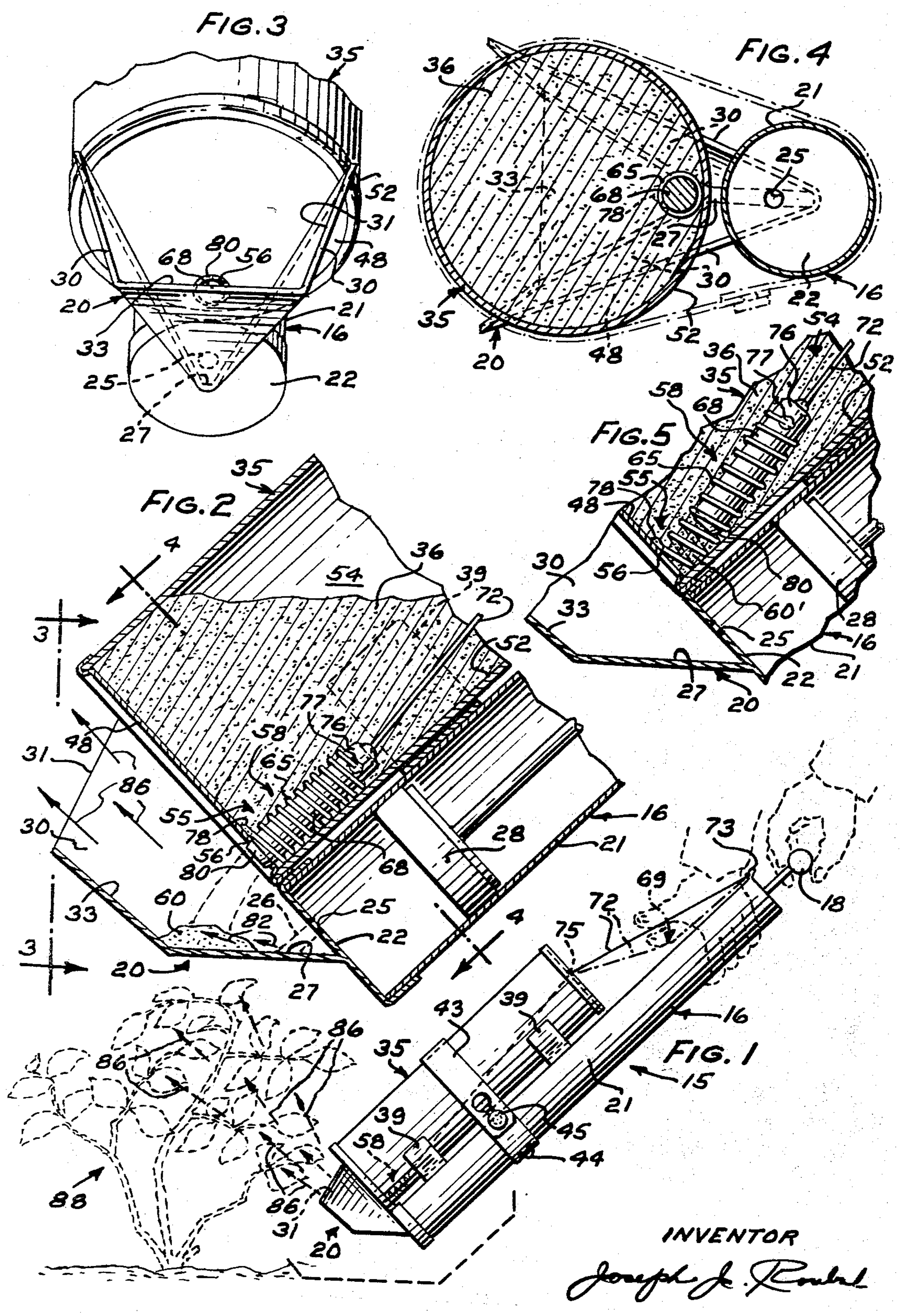
FIG. 1 is a side elevational view of an apparatus constructed in accordance with the invention and illustrates in dashed outline a holding thereof when dusting a ground growing plant.
FIG. 2 is an enlarged fragmentary longitudinal section taken bottom wise through the apparatus of FIG. 1.
FIG. 3 is taken on 3—3 of FIG. 2.
FIG. 4 is taken on 4—4 of FIG. 2.
FIG. 5 illustrates an operating position of the feature shown in FIG. 2.

Referring to the drawings, the plant dusting apparatus 15, in the present instance, comprises an air pump 16 arranged by an elongated support or cylinder 21. In use and operation of the apparatus, as is shown in FIG. 1, the elongated cylinder is held at one end angularly in a downward direction, generally at 45 degrees angular inclination, thus, by one operator's hand, and the pump is operated by a pump handle 18 by the operator's other hand. A trough device 20 is attached suitably to the support cylinder 21 at the distal end 22 and which is a bottom end wall of the cylinder. In this end wall of the cylinder, an aperture 25 is arranged to allow a gust of air 26 to discharge and strike an inside horizontal surface 27. This is realized when the handle 18 is abruptly or sharply pushed inward of the cylinder moving a piston 28. As provided suitably by a thin wall construction, the inside horizontal surface 27 is arranged bottom wise and between upstanding inside wall surfaces 30, 30 which preferably flare and this construction, as is shown, forms the trough device 20. Incorporated by the trough device to extend from the inside horizontal surface 27 and provided bottom wise between extended portions of the upstanding wall surfaces 30, 30 is an angularly directed surface 33. As is shown, the terminating edges of the extended portions of the wall surfaces 30, 30 and the terminating edge of the angularly upwardly directed surface 33 form an enlarged open end 31 and thereby the inside wall surfaces 30, 30 in connection with the horizontal surface 27 are open top wise directly to the atmosphere, as is shown.

Also attached to the support cylinder 21 is a container 35 normally housing insecticide and or fungicide powder dust 36. Brackets 39, 39 attachably locate the container on the cylinder, and in the attachment may serve an elastic 43 fixed at 44 and latched by an eyelet-button 45.

It will be seen, the container 35 has the usual bottom or horizontal wall 48, and such may rest top wise on the upstanding walls of the trough device 20. The usual vertical wall 52, preferably of a cylindrical shape, converges with the horizontal wall 48 to form the usual bottom in the container 35. By reference to FIG. 1, it will be seen, that the holding of the elongated support or cylinder 21, as is described, angularly in a downward direction generally at 45 degrees angular inclination, the usual horizontal wall 48 and the therewith converging usual vertical wall 52 are also disposed at 45 degrees angular inclination, and it is seen, that thereby in the container 35 is realized an absolute low level bottom, designated 55. It will be seen, that, due to the angular disposition of the container walls, as is described, the insecticide and or fungicide powder dust 36 is directed to locate more especially with respect to the absolute low level bottom 55, and thereby, with least attention to such on the part of the operator, and taking place in the operation of the apparatus, the powder dust in the container 35 will permit constant availability until its complete utilization generally.

Arranged with respect to the low level bottom 55, and shown formed in the usual bottom wall 48, is an aperture 56 of restricted size, and through this aperture a restricted quantity of the powder dust, designated 60, is ejected and is received to locate, top wise openly in direct presence of the atmosphere, as is shown in FIG. 2, at a one place surface that is provided by the upstanding inside wall surfaces 30, 30 and the inside horizontal surface 27.

Ejecting devices and arrangements of different form may be utilized to eject the restricted quantity of the powder dust. However, as such involves a novel, a simplified, and convenient handling control, to this end in FIG. 2 is shown that when an ejecting-closure means 58 is operated, the ejecting by a plug 68 through the aperture 56 of the restricted quantity of the powder dust 60 takes place. The ejecting-closure means 58, at the low level bottom 55, is also shown in FIG. 5, here illustrating the powder dust initially available in the container, designated 60', as having entered within the central space of a coiled spring 65 when, as is shown, this spring is operatively pulled and extended and whereby the plug 68 is withdrawn from the aperture 56.

It is noted, the pulling and extension of the spring 65 and the withdrawing of the plug 68 is realized by the same operator's hand holding angularly in the downward direction of the support cylinder 21 at 45 degrees angular inclination, as is described, and wherein to this end, as is indicated in FIG. 1, this hand's thumb contacts and depresses at 69 a draw cord 72. The draw cord 72 is suitably attached at 73 at the top end of the support cylinder, and this cord, arranged generally taut and passing through an aperture 75 in the usual top wall of the container 35, is suitably fixedly attached at a top end 76 of the plug 68. At the top plug end at 77 is also attached the spring 65. As is shown, the spring 65 is arranged concentrically of the aperture 56 and at its base end is fixedly attached at 78. It will be seen, a releasing from the position 69 by the operator's thumb of the cord 72, and from its operative tautness, shown in FIG. 5, and whereby the spring 65 is permitted to contract resiliently, automatically operates therewith to eject the powder dust restricted quantity 60 through the aperture 56 and therewith the plug 68 operates, in a chamfered end 80, also automatically to close this aperture 56. It should be understood, the spring 65 permits varying withdrawing of the plug 68 which depends upon the depressing and thereby pulling of the cord 72 by the operator's thumb, and by which, in accordance with the operator's intention, a larger or smaller powder dust restricted quantity 60 may be ejected.

As has been described, the container supplied powder dust restricted quantity 60 is ejected and received to locate top wise openly in direct presence of the atmosphere at the one place surface of the upstanding inside wall surfaces 30, 30 and the inside horizontal surface 27. Also shown (FIG. 2) is the gust of air 26 striking a proximate area arranged by the surface 27 thus at a suitable spacing of the one place surface whereat is located the powder dust 60. By this arrangement, it will be seen, as is indicated by arrows 82, a supplied gust of air leaves the proximate area deflectively and thereby in the direct presence of the atmosphere operates to expand the located powder dust. In this manner, it will be seen, the gust of air operates in effect by layers to expand the powder dust. And it will be seen, the full effect of the applied gust of air causing the powder dust to expand at the one place surface and taking place therewith openly top wise between the surfaces of the extended portions of the upstanding inside wall surfaces and directed by the angularly upwardly directed surface 33 causes that this expanded dust be directed angularly upwardly, indicated by arrows 86, and therewith by means of the enlarged open end 31, as is described, whereby the trough device is open top wise, such is directed angularly upwardly into the atmosphere, as is shown.

As concerns the foregoing, it should be noted, a strong gust of air, or several weak gusts of air, may be supplied to expand the insecticide and or fungicide powder dust in the smaller or larger ejected restricted quantity size as is made available at the one place surface of the trough device, and accordingly these operations are completely under the control of the operator.

The apparatus is illustrated in FIG. 1 wherein such is held for operation, in accordance with the invention, in adjacent proximity and base wise of a ground growing plant 88, thereby to the end that the under sides of the plant's leaves may be dusted. It will be seen that due to the apparatus, and which involves the holding and the operation thereof, as is described, and whereby the expanded powder dust is blown into the atmosphere thus upwardly in the direction 86, that such expanded dust will strike and tend to cover the plant's leaves more especially at their under sides; it being understood of course that such expanded powder dust as fails in this purpose will variously fall and tend to cover the plant's leaves at their top sides.

What is claimed is:

1. Apparatus for dusting comprising elongated support means having an end by which the elongated support means is held and an opposite extremity end which is a distal end, trough means carried by said elongated support means at said distal end, said trough means as the elongated support means is held downwardly generally at 45 degrees angular inclination having walls that provide a one place surface that is open top wise to the atmosphere for receiving and locating and expanding thereon in direct presence of the atmosphere a restricted quantity of powder dust, container means carried by the elongated support means, said container means normally housing a larger quantity of said powder dust, means operative for transferring from said container means into said trough means a restricted quantity of said powder dust and whereby the restricted quantity of the powder dust is received to locate on said trough means one place surface, and air gust producing means arranged by the elongated support means, said air gust producing means being arranged and operative to produce a gust of air that strikes a proximate area of said one place surface whereby when a restricted quantity of the powder dust is located on said one place surface and thus in direct presence of the atmosphere a produced gust of air in striking said proximate area will operate to expand said located powder dust.

2. Apparatus for dusting comprising elongated support means having an end by which the elongated support means is held and an opposite extremity end which is a distal end, trough means carried by said elongated support means at said distal end, said trough means as the elongated support means is held downwardly generally at 45 degrees angular inclination having walls that provide a one place surface that is open top wise to the atmosphere for receiving and locating and expanding thereon in direct presence of the atmosphere a restricted quantity of powder dust, and air gust producing means arranged by the elongated support means, said air gust producing means being arranged and operative to produce a gust of air that strikes a proximate area of said one place surface whereby when a restricted quantity of powder dust is located on said one place surface and thus in direct presence of the atmosphere a produced gust of air in striking said proximate area will operate to expand said located powder dust.

References Cited

UNITED STATES PATENTS

| | | | |
|---|---|---|---|
| 334,934 | 1/1886 | Campbell | 43—147 |
| 572,907 | 12/1896 | Norton | 43—147 |
| 645,028 | 3/1900 | Barber | 43—147 |

FOREIGN PATENTS

| | | |
|---|---|---|
| 616,929 | 8/1935 | Germany. |

SAMUEL KOREN, *Primary Examiner.*

W. H. CAMP, *Assistant Examiner.*